US008540536B1

(12) United States Patent
Eichinger et al.

(10) Patent No.: US 8,540,536 B1
(45) Date of Patent: Sep. 24, 2013

(54) SYSTEMS AND METHODS FOR COOLING MARINE ENGINES

(75) Inventors: Charles H. Eichinger, Oshkosh, WI (US); Gregg D. Langenfeld, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 372 days.

(21) Appl. No.: 12/944,454

(22) Filed: Nov. 11, 2010

(51) Int. Cl.
*F01P 3/12* (2006.01)

(52) U.S. Cl.
USPC ............. 440/88 K; 440/88 C; 440/88 G; 440/88 J

(58) Field of Classification Search
USPC ....... 440/88 C–88 K, 89 B, 89 C; 123/41.01, 123/195 P, 41.8
See application file for complete search history.

(56) References Cited

U.S. PATENT DOCUMENTS

| | | | | |
|---|---|---|---|---|
| 3,358,654 | A | * | 12/1967 | Shanahan et al. .......... 123/41.08 |
| 4,133,284 | A | * | 1/1979 | Holcroft .................... 440/88 R |
| 5,036,804 | A | | 8/1991 | Shibata |
| 5,048,467 | A | | 9/1991 | Kojima |
| 5,873,330 | A | * | 2/1999 | Takahashi et al. ......... 123/41.31 |
| 5,904,605 | A | | 5/1999 | Kawasaki et al. |
| 5,911,610 | A | | 6/1999 | Fujimoto |
| 6,890,228 | B2 | | 5/2005 | Tawa et al. |
| 6,921,306 | B2 | | 7/2005 | Tawa et al. |
| 7,001,231 | B1 | * | 2/2006 | Halley et al. ................ 440/88 G |
| 7,114,469 | B1 | | 10/2006 | Taylor |
| 7,264,520 | B1 | | 9/2007 | Taylor et al. |
| 7,318,396 | B1 | | 1/2008 | Belter et al. |
| 8,388,393 | B1 | | 3/2013 | Eichinger et al. |
| 8,402,930 | B1 | | 3/2013 | Taylor et al. |

OTHER PUBLICATIONS

Cooling water flow diagram for prior art two-stroke and four-stroke marine engines (undated). This arrangement is hereby admitted prior art.

* cited by examiner

*Primary Examiner* — Edwin Swinehart
(74) *Attorney, Agent, or Firm* — Andrus, Sceales, Starke & Sawall, LLP

(57) ABSTRACT

A cooling system for a marine engine has an elongated exhaust conduit comprising a first end receiving hot exhaust gas from the marine engine and a second end discharging the exhaust gas; and an elongated cooling water jacket extending adjacent to the exhaust conduit. The cooling water jacket receives raw cooling water at a location proximate to the second end of the exhaust conduit, conveys raw cooling water adjacent to the exhaust conduit to thereby cool the exhaust conduit and warm the raw cooling water, and thereafter discharges the warmed cooling water to cool the internal combustion engine.

6 Claims, 5 Drawing Sheets

SYSTEMS AND METHODS FOR COOLING MARINE ENGINES

FIELD

The present disclosure relates to marine engines and to systems and methods for cooling marine engines.

BACKGROUND

Many known cooling systems for marine engines utilize glycol for cooling. These systems are often referred to as "closed" cooling systems because cooling fluid is continuously circulated though the system in a closed loop. Closed cooling systems are relatively expensive and complicated, requiring at least two pumps and a heat exchanger to transfer heat to sea water.

Other cooling systems for marine engines utilize sea water for cooling. These systems are often referred to as "open" systems. Sea water is pumped from an inlet port to the power head of the engine and then to an outlet port for discharge from the engine. The water typically is not recirculated through the engine. In some open cooling systems, an exhaust conduit associated with the engine is also cooled with the water after it has already cooled the power head of the engine. In these examples, the water typically exits the power head at thermostat temperature and then cools the exhaust conduit before exiting via an outlet port.

SUMMARY

The present disclosure arose from development efforts to provide inexpensive cooling systems that efficiently maintain optimal temperatures in components of marine engines. In most cases, it was found to be desirable to keep the cooling water jackets around the cylinders as warm as possible to thereby minimize fuel dilution of the oiling system. However temperatures in the cooling water jackets must also stay below a certain temperature, for example 140 degrees F., to avoid boiling and scale build-up. Since most open cooling systems do not have a recirculation pump, the appropriate coolant temperature is achieved by restricting coolant flow. This is accomplished by placing the thermostat in series with the cooling circuit, thus making the thermostat the controlling device for both coolant flow rate and coolant temperature. This results in a significant temperature difference in the cooling system between the inlet and outlet of the engine block.

The present inventor has found that this temperature difference can cause portions of the cylinders to be colder than the desired temperature, which undesirably increases oil dilution. The present inventor has also found that the temperature difference can also cause the cylinder head to be too cold, which undesirably causes water vapor to condense in the oil.

The present disclosure provides systems and methods conceived by the present inventor for cooling marine engines. In one example, a cooling system for a marine engine comprises an elongated exhaust conduit comprising a first end receiving hot exhaust gas from the marine engine and a second end discharging the exhaust gas. An elongated cooling water jacket extends adjacent to the exhaust conduit. The cooling water jacket receives raw cooling water at a location proximate to the second end of the exhaust conduit, conveys the raw cooling water adjacent to the exhaust conduit to thereby cool the exhaust conduit and warm the cooling water, and thereafter discharges the cooling water to cool the marine engine.

In another example, a cooling system for a marine engine comprises an internal combustion engine; an elongated exhaust conduit comprising a first end receiving hot exhaust gas from the engine and a second end discharging the exhaust gas; and an elongated cooling water jacket extending along and adjacent to the exhaust conduit. The cooling water jacket receives raw cooling water at a location proximate to the second end of the exhaust conduit, conveys the cooling water adjacent to the exhaust conduit to thereby cool the exhaust conduit and thereafter cool the internal combustion engine.

In another example, a method of cooling a marine engine having an exhaust conduit receiving hot exhaust gas from the engine comprises pumping raw cooling water through an elongated cooling water jacket that is located adjacent to the exhaust conduit so that the cooling water cools the exhaust conduit and thereafter cools the engine.

Further examples are provided with reference to the drawing figures described herein below.

DETAILED DESCRIPTION OF THE DRAWINGS

Figure 1:
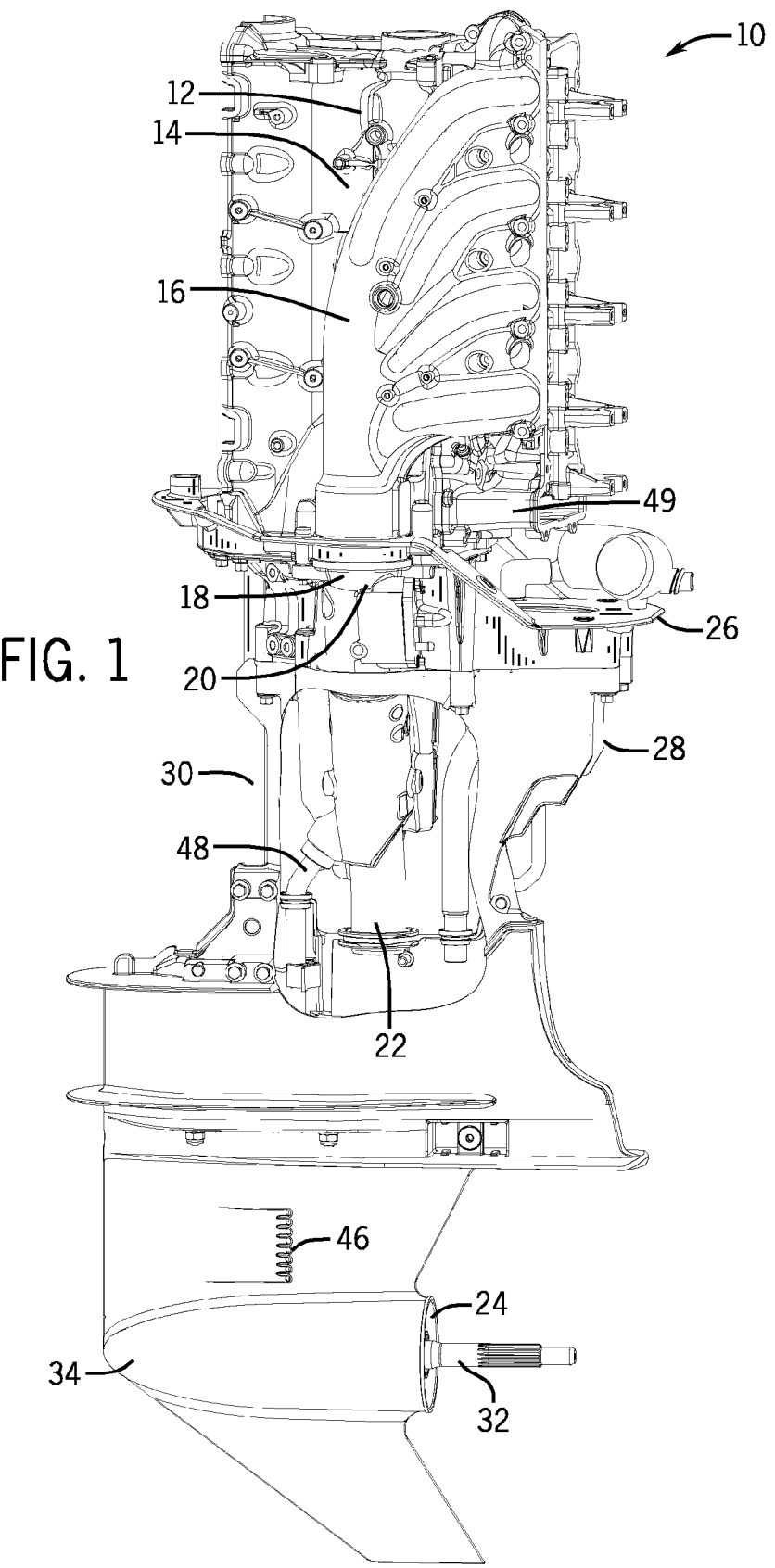
FIG. 1 is a side view of a marine engine with a portion of the driveshaft removed to show internal components.
Figure 2:
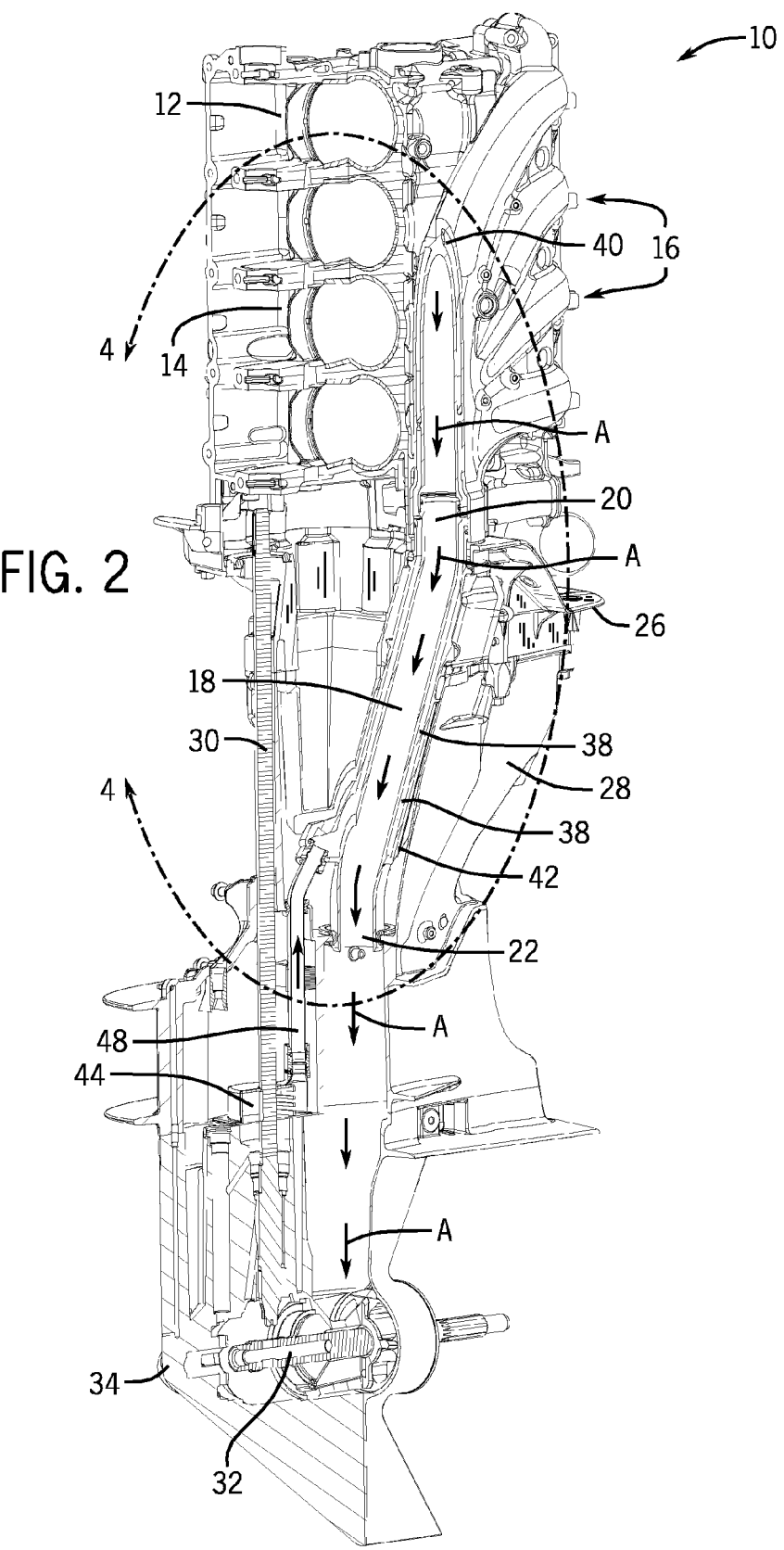
FIG. 2 is a perspective view, partially cut away, of the marine engine.
Figure 3:
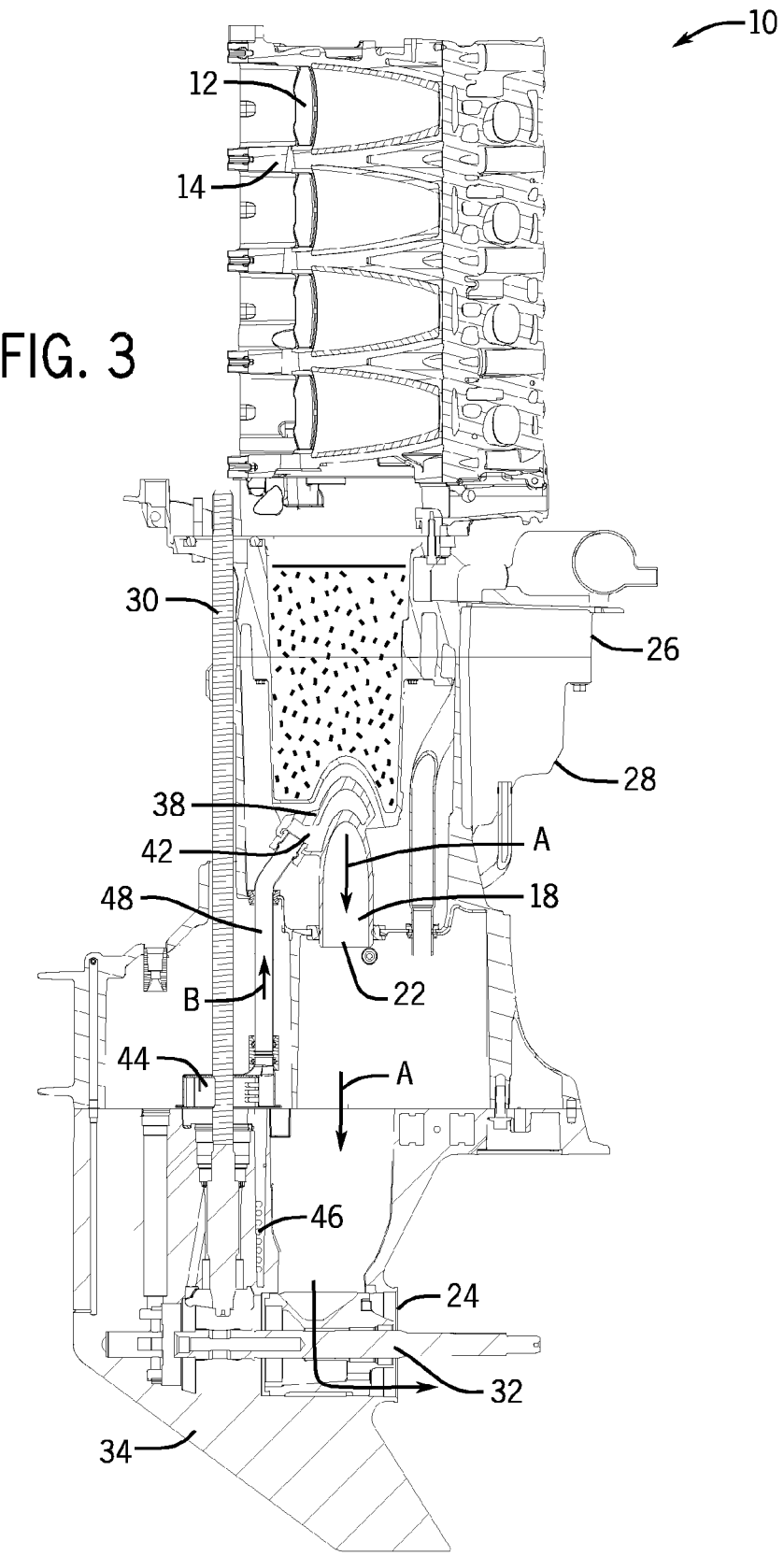
FIG. 3 is a side sectional view of the marine engine.
Figure 4:
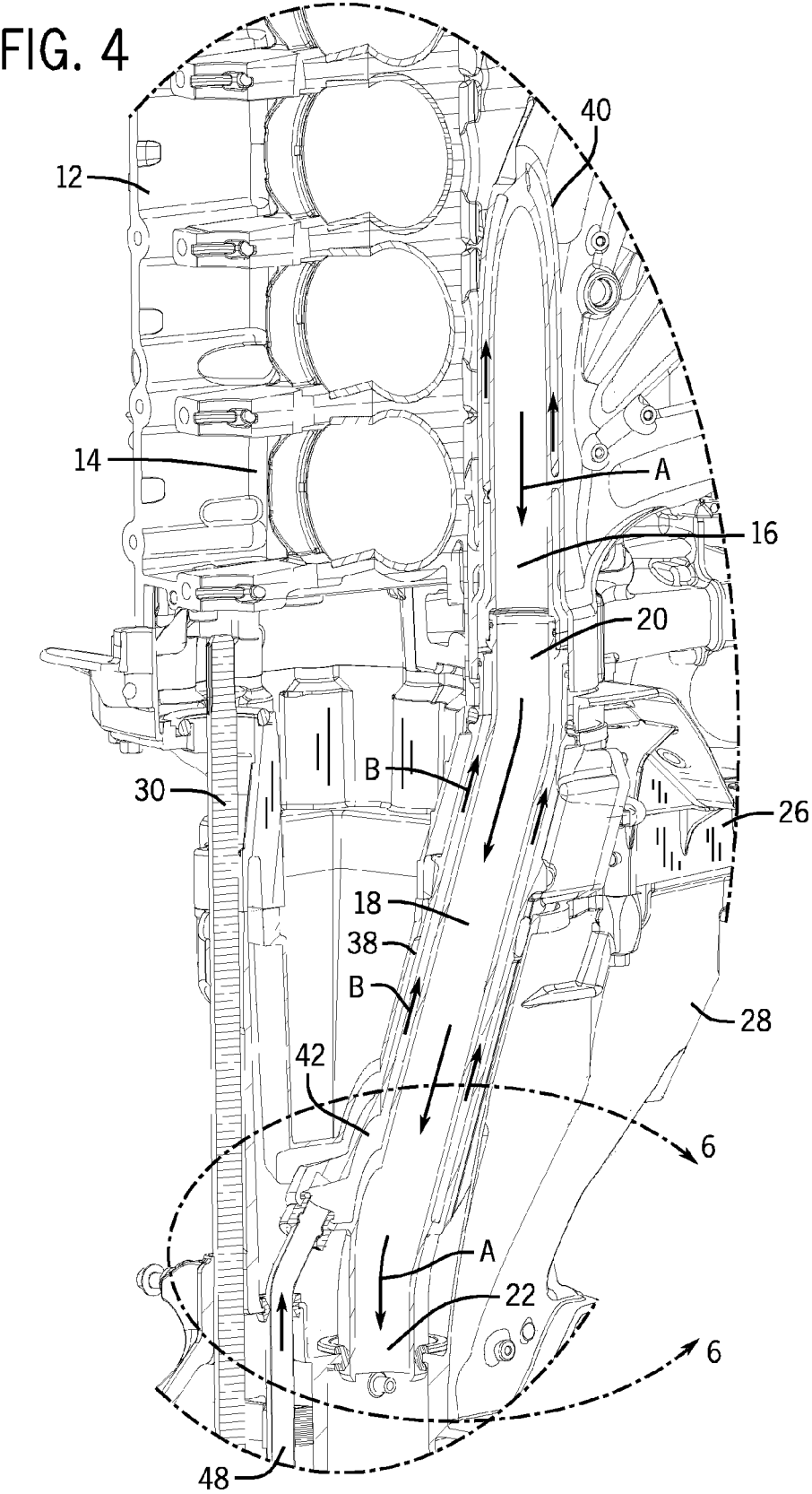
FIG. 4 is a view of Section 4-4 taken in FIG. 2.
Figure 5:
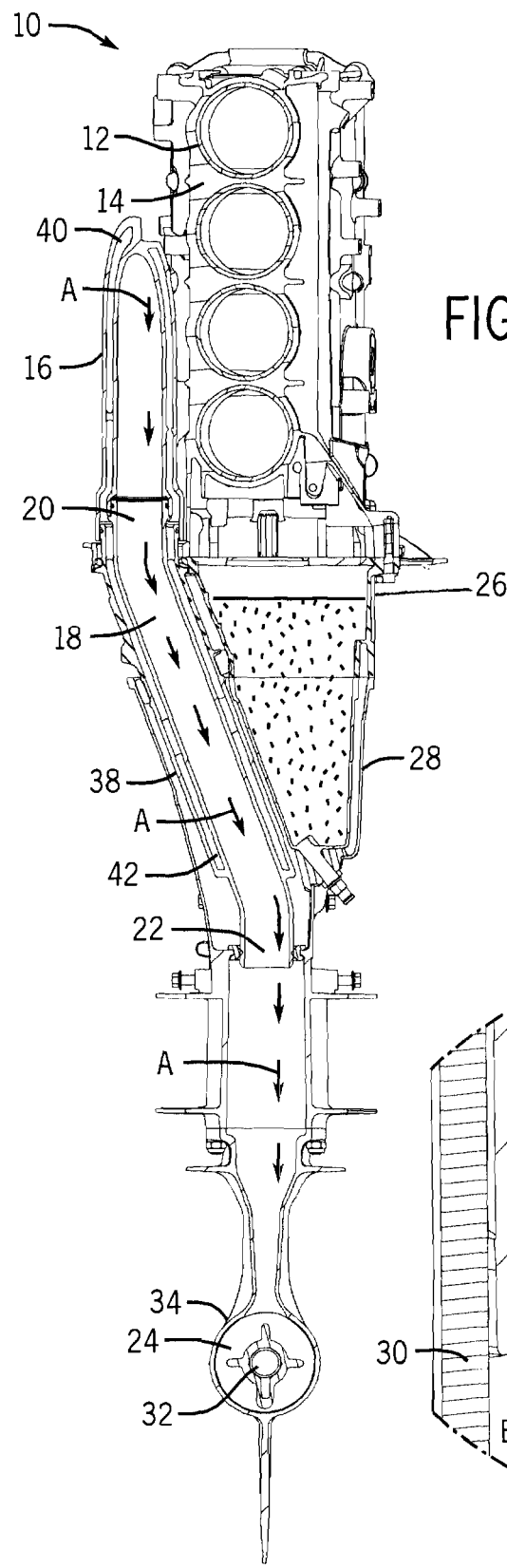
FIG. 5 is a rear sectional view of the marine engine.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

FIGS. 1 through 5 depict a marine engine 10 in the form of an outboard motor. The marine engine 10 includes an internal combustion engine 12 having a cylinder head 49 discharging hot exhaust gas to an exhaust manifold 16. The exhaust manifold 16 discharges to an elongated exhaust conduit 18, which has a first end 20 receiving the hot exhaust gas from the internal combustion engine 12 and a second end 22 discharging the exhaust gas which ultimately leaves the marine engine 10 via an exhaust outlet 24 (see FIGS. 1, 3 and 5). The exhaust gas travel is shown at arrows A.

The internal combustion engine 12 is supported by an adapter plate 26 connected to the driveshaft housing 28. A driveshaft 30 extends through the driveshaft housing and connects to and drives prop shaft 32 in prop shaft housing 34, as is conventional.

A cooling system is configured to cool hot engine parts such as for example the cylinder head 49, adapter plate 26, and exhaust conduit 18. Cooling system includes an elongated cooling water jacket 38 extending along and adjacent to the exhaust conduit 18. The cooling water jacket 38 receives raw cooling water at a location proximate to the second end 22 of the exhaust conduit 18, conveys raw cooling water adjacent to the exhaust conduit 18, as shown at arrows B (see FIG. 4), to thereby cool the exhaust conduit 18 and thus warm the cooling water. Thereafter, the cooling water is discharged to cool other components of the internal combustion engine 12. Specifically, the cooling water jacket 38 includes a first end 40 discharging the cooling water after being warmed by the relatively hot exhaust conduit 18 and a second end 42 receiving the raw cooling water at a location proximate the second end 22 of the exhaust conduit 18. A pump 44 (see FIG. 2) draws raw cooling water through inlet 46 (see FIG. 1) and pumps the raw cooling water from the second end 42 of the cooling water jacket 38 to the first end 40 of the cooling water jacket 38. In the example shown, the inlet 46 is connected to the second end 42 of the cooling water jacket 38 via the water pump 44 and a water tube 48.

Figure 6:
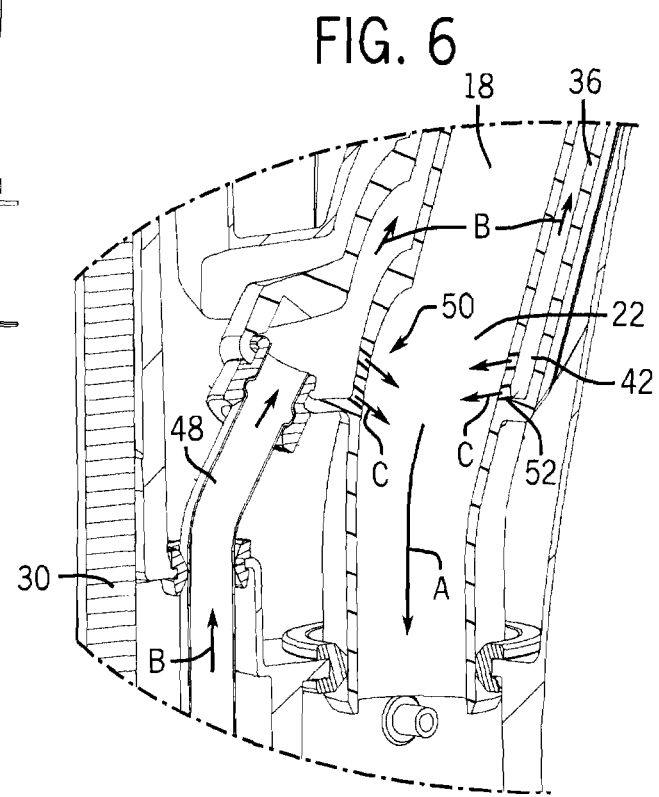
FIG. 6 is a view of Section 6-6 taken in FIG. 4 showing an alternate embodiment.

In an example shown in FIG. 6, an inlet 50 is located proximate the second end 22 of exhaust conduit 18 and is configured to receive and disperse a portion of the raw cooling water, shown at arrows C, being pumped by pump 44 into the exhaust conduit 24 to thereby wet the exhaust gas flowing through the exhaust conduit 24. In one example, a nozzle 52 can be provided for spraying the portion of the raw cooling water into the exhaust conduit 18 at the location proximate the second end 22 of the exhaust conduit 18. Other configurations are envisioned by this disclosure including baffles or deflector plates for achieving optimal disbursement of cooling water into the exhaust gas.

With the above-described configurations, methods for cooling a marine engine 10 are envisioned. The methods can include pumping raw cooling water through the elongated cooling water jacket 38 located adjacent to the exhaust conduit 18 so that the raw cooling water cools the exhaust conduit 18 and thereafter cools the internal combustion engine 12. Further methods include discharging a portion of the raw cooling water to the exhaust conduit 18 at a location distal from the internal combustion engine 12 to thereby wet the exhaust gas in the exhaust conduit 18. Different methods of discharging the raw cooling water can be employed including spraying the raw cooling water into the exhaust conduit 18.

In a preferred example, the cooling water is utilized to cool the hot engine parts, including the cylinder head 49, and exhaust conduit 24 and related passages before entering the cylinder block water jackets. In this way, most of the heat rejected from the marine engine 10 is used to warm the cooling water before it enters the cylinder block 14. Compared to conventional designs, warmer coolant with increased water flow will be used to cool the cylinders with reduced temperature change between the inlet and outlet of the cylinder water jacket (not shown). This provides for warmer and more even, steady cylinder temperatures and has been found to reduce oil dilution and thermal stresses and distortions. In the example of FIG. 6, the use of incoming water near the bottom of the exhaust conduit 18 to cool the exhaust gas directly in the conversion from dry to wet exhaust is advantageous. Cooling water is removed from the cooling system before it is heated by the exhaust conduit, allowing all of the heat absorbed by the cooling water jacket 38 to be used to preheat the cooling water that will enter the cylinder block 14. This provides a very reliable exhaust cooling source because it is unaffected by water blockage elsewhere in the cooling system. This also maximizes the distance between the wet exhaust and the cylinders to help prevent water ingestion by the internal combustion engine 12.

What is claimed is:

1. A method of cooling an outboard marine engine having an exhaust conduit that receives hot exhaust gas from an internal combustion engine via an exhaust manifold and discharges the exhaust gas to a lower portion of a driveshaft housing, the method comprising pumping raw cooling water through an elongated cooling water jacket that is located adjacent to a majority of the exhaust conduit so that the raw cooling water cools the majority of the exhaust conduit and thereafter cools the exhaust manifold and the engine, wherein the exhaust conduit and the cooling water jacket extend into the lower portion of the driveshaft housing; comprising conveying the cooling water along the majority of the exhaust conduit; and comprising discharging a portion of the raw cooling water into the exhaust conduit at a location distal from the engine and in the lower portion of the driveshaft housing to thereby wet the exhaust gas in the exhaust conduit, prior to conveying the cooling water along the majority of the exhaust conduit.

2. The method according to claim 1, comprising spraying the portion of the raw cooling water into the exhaust conduit at the location distal from the engine and in the lower portion of the driveshaft housing.

3. An outboard marine engine comprising:
an exhaust manifold;
an internal combustion engine that discharges hot exhaust gas to the exhaust manifold;
an adapter plate that supports the internal combustion engine;
a driveshaft housing disposed below the adapter plate;
an exhaust manifold receiving hot exhaust gas from the internal combustion engine;
an elongated exhaust conduit comprising a first end that receives the exhaust gas from the exhaust manifold and a second end that is disposed in a lower portion of the driveshaft housing and that discharges the exhaust gas; and
an elongated cooling water jacket that extends along and adjacent to a majority of the exhaust conduit;
wherein the exhaust conduit extends into the lower portion of the driveshaft housing below the adapter plate;
wherein the cooling water jacket receives raw cooling water at a location proximate to the second end of the exhaust conduit, conveys the raw cooling water adjacent to the majority of the exhaust conduit to thereby cool the exhaust conduit and warm the cooling water, and thereafter discharges the warmed cooling water to cool the exhaust manifold;
wherein the cooling water jacket comprises a first end discharging the warmed cooling water and a second end receiving the raw cooling water at the location proximate the second end of the exhaust conduit; and
an inlet proximate to the second end of the exhaust conduit, wherein the exhaust conduit receives a portion of the raw cooling water via the inlet to thereby wet the exhaust gas in the exhaust conduit.

4. The outboard marine engine according to claim 3, comprising a pump pumping the raw cooling water from the second end of the cooling water jacket to the first end of the cooling water jacket.

5. The outboard marine engine according to claim 3, comprising a nozzle for spraying the portion of the raw cooling water into the exhaust conduit at a location proximate to the second end of the exhaust conduit.

6. The outboard marine engine according to claim 3, wherein the second end of the exhaust conduit discharges exhaust gas to a passageway for discharging exhaust gas to atmosphere.

* * * * *